(12) United States Patent
Wilcox

(10) Patent No.: US 6,697,710 B2
(45) Date of Patent: Feb. 24, 2004

(54) GAS PIPE EXPLORER ROBOT

(75) Inventor: Brian Wilcox, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 246 days.

(21) Appl. No.: 10/227,652

(22) Filed: Mar. 28, 2001

(65) Prior Publication Data

US 2003/0074108 A1 Apr. 17, 2003

Related U.S. Application Data

(60) Provisional application No. 60/192,705, filed on Mar. 28, 2000.

(51) Int. Cl.[7] .............................................. G06F 19/00
(52) U.S. Cl. ....................... 700/245; 700/248; 700/257; 700/258; 700/259; 700/266; 700/281; 385/100; 385/101; 385/102; 385/103; 385/105; 385/106; 385/107; 385/109; 385/110; 385/112; 385/113; 405/183.5; 405/150.1; 405/132; 318/16; 318/568.22; 324/238; 324/240; 324/242; 367/25; 367/69; 367/86; 73/623
(58) Field of Search ................................. 700/245, 248, 700/257, 258, 259, 266, 281; 318/16, 568.22; 324/238, 240, 242; 343/711, 713; 385/100, 101, 102, 103, 105, 106, 107, 109, 110, 112, 113; 367/25, 69, 86; 73/623; 378/60; 405/183.5, 132, 150.1; 248/71, 49

(56) References Cited

U.S. PATENT DOCUMENTS 4,822,211 A * 4/1989 Shinoda et al. .......... 405/183.5
4,862,808 A * 9/1989 Hedgcoxe et al. ........ 104/138.2
5,195,392 A * 3/1993 Moore et al. .............. 73/866.5
5,272,986 A * 12/1993 Smart ...................... 104/138.2
5,329,824 A * 7/1994 Carapezza et al. ......... 73/866.5
5,454,276 A * 10/1995 Wernicke ................... 73/865.8
5,565,633 A * 10/1996 Wernicke ................... 73/865.8
5,574,223 A * 11/1996 Kiefer .......................... 73/623
5,736,821 A * 4/1998 Suyama ....................... 318/16

OTHER PUBLICATIONS

Hirose et al., Design of In–pipe Inspection Vehicles phi25, phi50, phi150 pipes, 1999, IEEE, pp. 2309–2314.*
kawaguchi et al, An efficient algorithm of path planning for an internal gas pipe inspection robot, 1992, IEEE, pp. 1155–1160.*
Bertto et al., Robot flessibile a basso costo per ispezioni tuni, 2001, Internet, pp. 1477–1483.*
Foster–Miller, Internal pipe inspection system, no date, Internet, pp. 1–2.*

* cited by examiner

Primary Examiner—William A. Cuchlinski, Jr.
Assistant Examiner—McDieunel Marc
(74) Attorney, Agent, or Firm—Fish & Richardson P.C.

(57) ABSTRACT

A gas pipe explorer formed of a plurality of connecting elements, and an articulation element between the connected elements. The connected elements include drive capabilities, and the articulation element allows the connected elements to traverse gas pipes of arbitrary shapes and sizes. A sensor may sends the characteristics of the gas pipe, and the communication element may send back those sends characteristics. The communication can be wired, over a tether connecting the device to a remote end. Alternatively, the connection can be wireless, driven by either a generator or a battery.

12 Claims, 2 Drawing Sheets

GAS PIPE EXPLORER ROBOT

CROSS REFERENCE TO RELATED APPLICATIONS

This application claims the benefit of the U.S. Provisional Application No. 60/192,705, filed Mar. 28, 2000.

STATEMENT AS TO FEDERALLY-SPONSORED RESEARCH

The invention described herein was made in the performance of work under a NASA contract, and is subject to the provisions of Public Law 96-517 (U.S.C. 202) in which the contractor has elected to retain title.

BACKGROUND

The United States has approximately one million kilometers of natural gas distribution pipelines, and also has an uncountable amount of other kinds of pipelines. These networks have been aging, and this aging may cause a great concern to the industries. Much of the network of pipelines is formed of iron and steel pipe which is now considered to be technologically obsolete.

It may be desirable to assess the state of various pipes in the network. A failed pipeline may cause an outage, which may be very costly since the utility may be responsible for re-lighting all of the pilot lights which are caused by the outage. In addition, a failed pipeline may cause disruptive urban excavation.

Leaks and reductions of pipe wall thickness, may be mostly the result of chemical reactions between iron in the pipe and chemicals in the soil and groundwater. A magnetic flux leakage sensor may be used for determining the average wall thickness of an iron or steel pipe.

SUMMARY

The present application teaches an intelligent robotic gas pipe explorer. The device may include operating instruments and sensors that may detect leaks, wall thinning, corrosion, and other difficulties in the pipe.

In an embodiment, the explorer may be operated wirelessly in an operating pipeline. Information from the exploration is relayed through wireless communications that rely on the waveguide characteristics of the pipeline. For example, this information may be transmitted at GHz frequencies. This system may also use shape reconfigurability to enhance its mobility and to overcome traversal problems such as pipe narrowing, pieces of extending welds, and the like. The device may use an imaging camera for visual inspection. The device may extract power from the flowing gas using a power-generating turbine.

Another embodiment uses a wired device, connected and powered by a tether. The wired device may also communicate over that wired line.

BRIEF DESCRIPTION OF THE DRAWINGS

These and other aspects will now be described in detail with reference to the accompanying drawings, wherein.

DETAILED DESCRIPTION

Figure 1:
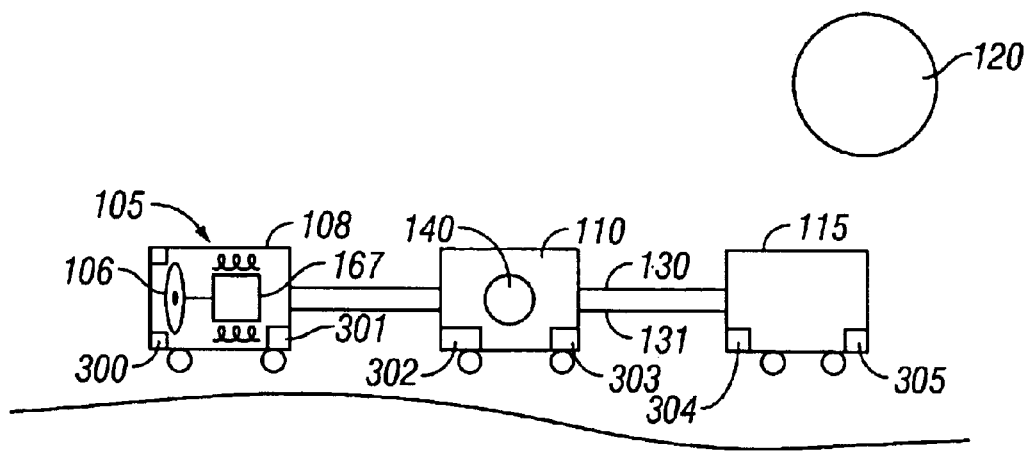
FIG. 1 shows a first embodiment, using a wireless element.

FIG. 1 shows a first embodiment of the gas pipe explorer vehicle. A majority of the gas distribution pipelines are in the form of 4 and 6-inch diameter pipes. These may be tributaries off of main pipes which may be as large as 48 inches in diameter. In addition, the process of welding the tributaries to the mains may leave extensions, e.g. extensions of one inch or even more.

The gas pipe explorer is formed of multiple elements which are connected together with connections like a railroad train in a way that allows each device to move independent of the other. The device includes an articulated snake-like robot 100 formed of three connected sections 105, 110, 115, as shown, although there may be more elements, or only two sections. Each wheel on each element of the explorer may have its own motor, as shown in FIG. 1 which shows motors 300, 301, 302, 303, 304 and 305. Alternatively, only some of the wheels need to be driven, with others of the wheels being passive.

One of the elements of the train is the power generator 105. The gas flow rate through a four inch pipe is typically 10 meters per second at 4 bar (60 pounds per square inch) of pressure. This can provide sufficient locomotive power to drive the motors. Power-generating turbine 105 may include a permanent magnet motor, which is back driven to be used as a generator. An impeller 106, which can be radially or axially flow driven, drives a stator 107 that cuts through the field produced by magnet 108, to extract power from the flow of gas. This power-generating element may be used by itself, or in combination with battery power, to drive all of the driven elements including the motors and the sensors.

The vehicle is preferably at least two meters long when extended, to allow its insertion into a four-inch pipe such as 120 that emanates from centerline of a 48 inch pipe. The vehicle allows its head to be lifted 24 inches off the ground and extended into the tributary pipe.

The body of the device extends between the motors. The body between motors includes first and second telescoping tubes 130, 131. Each of the tubes 130, 131 can be individually telescoped and retracted to cause the device to move into any desired way. For example, the tube 131 may be extended to force the front part 115 to rise to the position of the tributary pipe 120. However, in order to allow the device to negotiate turns properly, the maximum length of the device in its collapsed position should be less then $4\sqrt{R0^2 + R1*(R0-R2) - R2^2}$, where R0 is the inside radius of the pipe, R1 is the inside radius of the smallest turn in the pipe, and R2 is the outside radius of the telescoping tube.

The device may also include inflatable bladders 140 which can be inflated to exert force against side walls of the pipe. Each bladder may be affixed to each of the telescoping tube segments. The bladders can be alternately inflated and deflated, and the telescoping may be extended or retracted. This operation can allow the device to move using an inchworm-like operation. Multiple bladders, on each side of the telescoping segments, can allow positioning of the device within any desired location on the pipe cross-section. In addition, the tube axis may be angled with respect to the pipe axis. This may be important in mobility control.

Up to eight bladders may be affixed to each section. Up to four bladders may be affixed to the pipes 130, 131. Control of these bladders may enable intelligent behavior for negotiation of various obstacles. The bladders may also be deflated to reduce the overall diameter, to allow, for example, traversing one-inch obstructions within a four-inch pipe. This may be important, since side pipes may leave obstructions.

Figure 2:
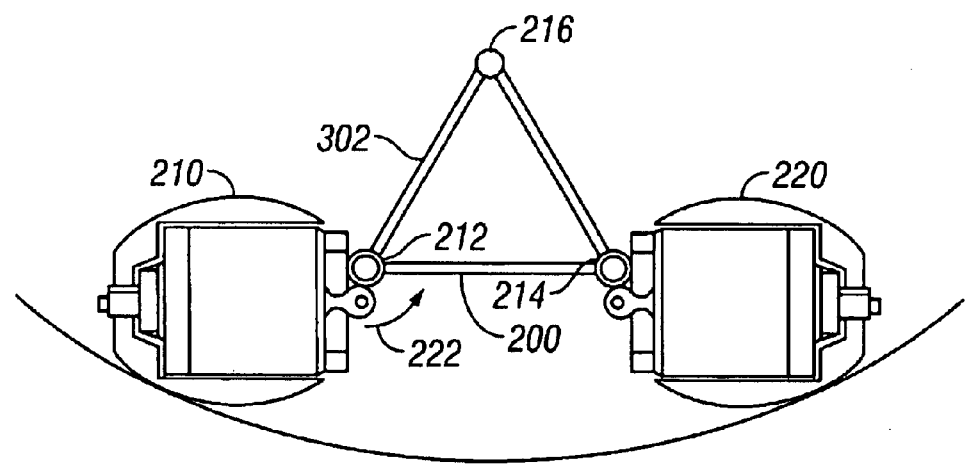
FIG. 2 shows a front on view of a second embodiment in an extended state.
Figure 3:
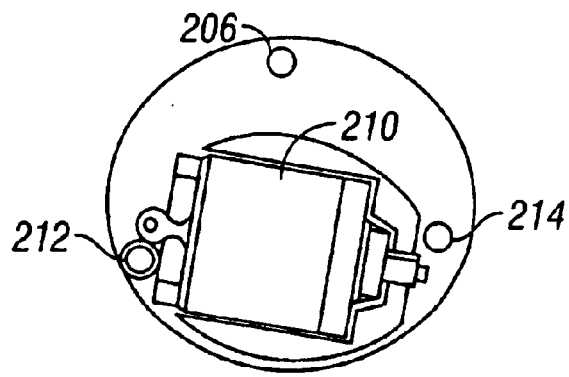
FIG. 3 shows a single motor in the stowed state.

An alternative embodiment is shown in FIG. 2. In this alternative embodiment, a snake like robot is formed. The device is formed of a plurality of motor/wheel assemblies, which are spring loaded, and formed along a triangular frame. FIG. 2 shows the basic device. The triangular frame 200 is formed of three-dimensional pieces extending in a substantially triangular shape. A first wheel/motor assembly 210 is located at a first corner 212. A second corner 214 has a second wheel/motor assembly 220. The wheel/motor assemblies are shown in their fully extended positions in FIG. 2. The may rotate by cam action in the direction of arrow 222 into a stowed position. In this stowed position, the wheel/motor assembly fits within the confines of the triangular frame as shown in FIG. 3. Note that the wheel/motor assembly 210 has rotated in the direction of arrow 222, into its stowed position. In FIG. 3, the frame in this stowed position may fit within a one-inch pipe.

Figure 4:
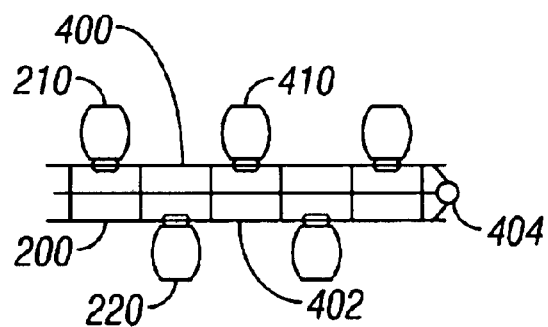
FIG. 4 shows a top view showing the arrangement of motors.

The connections to the wheel/motor assemblies are offset from one another as shown in FIG. 4. The assembly 210 and assembly 220 are in different locations so that the stowed device has a minimum size. The sensor 404, which may be a camera and/or any device which can detect the condition of the pipes, may be in the front of the device. FIG. 4 shows the motors extended or deployed to fit into wider pipes. Moreover, the frame 200 may be formed of a spring material to allow the device to contort into different shapes.

The motor may be a coreless DC motor available from micromo.com. The preferred motor may be 12 mm in outer diameter. In this embodiment, the wheels may be spaced approximately 7 centimeters apart, providing a total of approximately 30 powered wheels. Each of the motors 100 dissipates a maximum of 0.3 watts. Thirty wheels can hence be configured with a total power dissipation of approximately 10 watts or less. When deployed, the device can operate within a pipe between 4 and 48 inches. When stowed, the device can operate in a pipe as small as one inch.

This embodiment may be articulated by flexing the frame 200. The flat frame is divided into sections shown as 400, 402 etc. Each of these sections may be commanded to bend into a circular arc using the motors. For example, the frame may be commanded to bend into the right or left, up or down, or into any combination of the same. Each length, of approximately one-half meter, may be so actuated. Three motors in a cluster, such as 210, 220, 410, may be used to push or pull on the frame wires by a screw drive.

Figure 5:
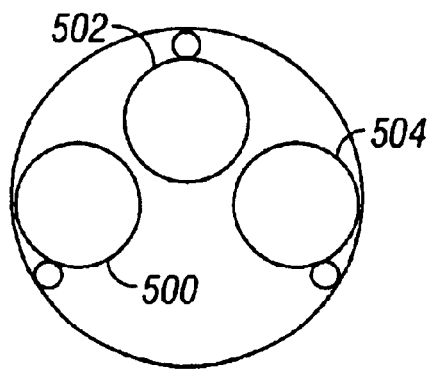
FIG. 5 shows the motors used for articulation.

FIG. 5 shows an arrangement to carry this out. In the FIG. 5 arrangement, smaller motors are used for frame articulation. The motors 500, 502, 504 may be 8 mm Micromo motors. Four sets of these actuators in may allow complex shapes including the classic threat produce of a cobra snake, with a front, horizontal orientation, a mid vertical orientation, and a rear horizontal orientation. This orientation may be used to enter feeder pipes from inside a larger pipe. Other elements along the length may also be used.

Power may be supplied by a fine wire tether. The minimum mass tether to deliver power to the robot with a wasted power W lost in the resistance of the tether, over a two wire umbilical with length L. has an optimal copper radius are given by $$R=[p2\sigma(P+W)^2L/(2\pi p1 v^2 W)]^{1/4}$$

where copper has a mass density of p1 (8950 kg/m³), the insulation has a mass density of P2 (for Teflon, this being 1450 kg/M³), σ is the resistivity of copper ($1.7\times10^{-8}$ ohm-m) and v is the dielectric strength of the insulation. This value is very conservatively $10^6$ volts/m for Teflon; it is actually about 10 times more than this; however abrasion of the insulation should be accommodated. Note that the gas pipe atmosphere is not explosive since there is no oxygen, so arcing is not catastrophic but could comprise the mission of the vehicle. For these values of the constants and with P=10 watts, L=10 km, and W=200 watts, we get $R_1$=176 microns or a 33 gauge wire. The copper in this tether would have a mass of about 4.5 kg.

The tether is stored in small canisters as part of each wheel assembly. As each canister is exhausted from the rear of the vehicle, the tether slidse through a hole in the front and pull out from the next canister forward. In this manner, the tether weight can be distributed over the length of the vehicle and the vehicle range increased in a modular way by decreasing the number of wheel assemblies.

Communications may be provided by modulating the current in the power tether using commercially available powerline modulation technologies.

Although only a few embodiments have been disclosed in detail above, other modifications are possible.

What is claimed is:

1. A gas pipe explorer, comprising:
   a first driving element including a first drive structure therein;
   a second driving element including a second drive structure therein;
   an articulation element, between said first and second driving elements, and allowing the first and second driving elements to articulate to a plurality of different positions, including a position which allows one of said driving elements to be lifted off of a driving surface relative to an other of said driving elements;
   a sensor element coupled to one of said elements, and operating to detect and communicate a condition of a gas pipe; and
   wherein said articulation element includes a triangular shaped frame, and at least one motor operating to change a shape of said triangular shaped frame.

2. A device as in claim 1, wherein said first and second driving elements are at opposite corners of said triangular shaped frame.

3. A device as in claim 2, wherein said first and second driving elements are at different locations along a length of said triangular shape frame.

4. The device as in claim 1, further comprising cam rotation elements, operating to allow said first and second driving elements to rotate relative to said frame between an extended position, where the first and second driving elements are outside of said frame, and a stowed position, where the first and second driving elements are stowed within a perimeter of said frame.

5. The device as in claim 1, further comprising cam rotation elements, operating to allow said first and second driving elements to rotate relative to said frame between an extended position, where the first and second driving elements are outside of said frame, and a stowed position, where the first and second driving elements are stowed within a perimeter of said frame, at different locations along a length of said frame.

6. A gas pipe explorer, comprising:
   a first driving element including a first drive structure therein;
   second driving element including a second drive structure therein;

an articulation element, between said first and second driving elements, and allowing the first and second driving elements to articulate to a plurality of different positions, including a position which allows one of said driving elements to be lifted off of a driving surface relative to an other of said driving elements;

a sensor element coupled to one of said elements, and operating to detect and communicate a condition of a gas pipe; and wherein said sensor element includes a wireless communication element which communicates wirelessly information related to a condition of said gas pipe.

7. A device as in claim 6, further comprising a power generation element, generating power for driving said first and second driving elements, and said sensor, from a flow of gas in the gas pipe.

8. A device as in claim 7, wherein said wireless communication element produces a frequency which is tuned to waveguide characteristics of the gas pipe.

9. A gas pipe explorer, comprising:

a first driving element including a first drive structure therein;

a second driving element including a second drive structure therein;

an articulation element, between said first and second driving elements, and allowing the first and second driving elements to articulate to a plurality of different positions, including a position which allows one of said driving elements to be lifted off of a driving surface relative to an other of said driving elements;

a sensor element coupled to one of said elements, and operating to detect and communicate a condition of a gas pipe; and wherein said sensor element includes a wired communication element which communicates information indicative of a condition of said gas pipe over a wire.

10. A device as in claim 9, wherein said wire also carries power to drive said first and second driving elements.

11. A gas pipe explorer, comprising:

a first driving element including a first drive structure therein;

a second driving element including a second drive structure therein;

an articulation element, between said first and second driving elements, and allowing the first and second driving elements to articulate to a plurality of different positions, including a position which allows one of said driving elements to be lifted off of a driving surface relative to an other of said driving elements;

a sensor element coupled to one of said elements, and operating to detect and communicate a condition of a gas pipe; and a power generation element, generating power for driving said first and second driving elements.

12. A device as in claim 11, wherein said power generation element is a turbine driven by gas flow in the gas pipe.

* * * * *